United States Patent
Li et al.

(10) Patent No.: US 10,506,549 B2
(45) Date of Patent: Dec. 10, 2019

(54) PAGING MESSAGE SENDING METHOD, PAGING MESSAGE RECEIVING METHOD, AND DEVICE

(71) Applicant: HUAWEI TECHNOLOGIES CO., LTD., Shenzhen, Guangdong (CN)

(72) Inventors: Bingzhao Li, Beijing (CN); Xing Chen, Madrid (ES); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/649,037

(22) Filed: Jul. 13, 2017

(65) Prior Publication Data

US 2017/0318558 A1    Nov. 2, 2017

Related U.S. Application Data

(63) Continuation of application No. PCT/CN2015/070740, filed on Jan. 15, 2015.

(51) Int. Cl.
*H04W 68/10* (2009.01)
*H04W 68/02* (2009.01)
(Continued)

(52) U.S. Cl.
CPC ........... *H04W 68/02* (2013.01); *H04L 12/189* (2013.01); *H04W 72/005* (2013.01);
(Continued)

(58) Field of Classification Search
CPC ............. H04W 64/00; H04W 56/0045; H04W 56/005; H04W 88/08; H04W 64/003; H04W 4/22; H04W 56/006; H04W 4/021
See application file for complete search history.

(56) References Cited

U.S. PATENT DOCUMENTS

2002/0191682 A1* 12/2002 Moon ................ H04B 1/70758
375/147
2006/0199596 A1   9/2006 Teauge et al.
(Continued)

FOREIGN PATENT DOCUMENTS

CN        101043725         9/2007
CN        101171869         4/2008
(Continued)

OTHER PUBLICATIONS

Ngoc-Duy Nguyen et al., "Implementation and Validation of Multimedia Broadcast Multicast Service for LTE/LTE-Advanced in OpenAirInterface Platform", 9th IEEE International Workshop on Performance and Management of Wireless and Mobile Networks, 2013, XP32576012A, total 8 pp.
(Continued)

*Primary Examiner* — Quan M Hua
(74) *Attorney, Agent, or Firm* — Kilpatrick Townsend & Stockton LLP

(57) ABSTRACT

Embodiments of the present invention provide a paging message sending method, a paging message receiving method, and a device. A base station sends, to UE, configuration information of a first paging resource reserved by a core network for the UE. When the base station performs paging area paging on the UE, the base station sends, on the first paging resource, a first paging message to the UE. In the embodiments, all multiple cells included in a paging area use the first paging resource to perform paging area paging, and all the multiple cells use same paging scrambling code to scramble the first paging message when sending the first paging message.

20 Claims, 4 Drawing Sheets

(51) Int. Cl.
  *H04L 12/18* (2006.01)
  *H04W 72/00* (2009.01)
  *H04W 72/04* (2009.01)
  *H04W 4/06* (2009.01)
  *H04W 88/08* (2009.01)

(52) U.S. Cl.
  CPC ..... *H04W 72/042* (2013.01); *H04W 72/0446* (2013.01); *H04W 4/06* (2013.01); *H04W 88/08* (2013.01)

(56) References Cited

U.S. PATENT DOCUMENTS

| | | | |
|---|---|---|---|
| 2008/0268878 A1 | 10/2008 | Wang et al. | |
| 2008/0280631 A1* | 11/2008 | Lee | H04W 48/12 455/458 |
| 2010/0014660 A1* | 1/2010 | Kishiyama | H04J 11/005 380/31 |
| 2010/0034161 A1 | 2/2010 | Luo et al. | |
| 2010/0272004 A1* | 10/2010 | Maeda | H04L 5/0007 370/312 |
| 2012/0002626 A1 | 1/2012 | Wang et al. | |
| 2013/0044621 A1 | 2/2013 | Jung et al. | |
| 2013/0136072 A1 | 5/2013 | Bachmann et al. | |
| 2013/0182677 A1 | 7/2013 | Frenger et al. | |
| 2015/0031382 A1* | 1/2015 | Damnjanovic | H04W 52/0216 455/452.1 |
| 2016/0088541 A1* | 3/2016 | Quan | H04B 7/022 370/331 |

FOREIGN PATENT DOCUMENTS

| | | |
|---|---|---|
| CN | 101874422 | 10/2010 |
| CN | 102077665 A | 5/2011 |
| CN | 102843768 A | 12/2012 |
| CN | 103109573 | 5/2013 |
| CN | 103636241 A | 3/2014 |
| EP | 2234420 A1 | 9/2010 |
| JP | 2009182575 A | 8/2009 |
| JP | 2010525759 A | 7/2010 |
| JP | 2011530892 A | 12/2011 |
| JP | 2013524563 A | 6/2013 |
| KR | 10-2007-0107356 | 11/2007 |
| WO | 2007/107113 A1 | 9/2007 |
| WO | 2009/070096 A1 | 6/2009 |
| WO | 2009078152 A1 | 6/2009 |
| WO | 2012/039650 A1 | 3/2012 |

OTHER PUBLICATIONS

Extended European Search Report dated Dec. 21, 2017 in related European Patent Application No. 15877429.9.
International Search Report, dated Oct. 21, 2015, in International Application No. PCT/CN2015/070740 (4 pp.).
International Search Report dated Oct. 21, 2015 in corresponding International Patent Application No. PCT/CN2015/070740.
Office Action, dated Apr. 28, 2018, in Chinese Application No. 201580071846.7 (7 pp.).
Japanese Office Action dated Oct. 5, 2018 from Japanese Patent Application No. 2017-537930.

* cited by examiner

PAGING MESSAGE SENDING METHOD, PAGING MESSAGE RECEIVING METHOD, AND DEVICE

CROSS-REFERENCE TO RELATED APPLICATIONS

This application is a continuation of International Patent Application No. PCT/CN2015/070740, filed on Jan. 15, 2015, the disclosure of which is hereby incorporated by reference in its entirety.

TECHNICAL FIELD

Embodiments of the present invention relate to communications technologies, and in particular, to a paging message sending method, a paging message receiving method, and a device.

BACKGROUND

In a Long Term Evolution (Long Term Evolution, LTE for short) and an LTE-advanced (LTE-advanced, LTE-A for short) system, a base station sends a paging (Paging) message to instruct user equipment (User Equipment, UE for short) in an idle state (Idle) to establish a service or to notify the UE that a system message is changed, and the UE needs to re-read a changed system message, or the like. According to a paging message sending range, paging is classified into the following two manners: paging area paging and cell paging. A paging area includes multiple cells. In the paging area paging manner, a paging message is sent in an entire paging area, and is mainly used to instruct UE in an idle state to establish a service. In the cell paging manner, a paging message is sent only in a cell, and is mainly used to notify UE in the cell that cell system information is changed.

In the prior art, when the paging area paging is performed, multiple base stations page same UE in multiple cells, that is, the multiple base stations each send a paging message, and the base stations use different cell scrambling code to scramble the paging messages when sending the paging messages. Therefore, although content included in the paging messages of the multiple cells is the same, because different cells use different cell scrambling code to scramble the paging messages, the paging messages interfere with each other, and a paging success rate of the UE is relatively low.

SUMMARY

Embodiments of the present invention provide a paging message sending method, a paging message receiving method, and a device, so that paging messages sent by multiple cells in a paging area do not interfere with each other, thereby increasing a paging success rate of UE.

A first aspect of the present invention provides a base station, including:

a sending module, configured to send configuration information of a first paging resource to UE, where the first paging resource is a paging resource used when the base station performs paging area paging, the paging area includes multiple cells, and all the multiple cells use the first paging resource to page the UE;

a receiving module, configured to receive a paging request sent by a core network; and a processing module, configured to send a first paging indication to the UE according to the paging request, where the first paging indication is used to instruct the UE to receive, on the first paging resource, a first paging message sent by the base station, and the first paging message is a paging message used in the paging area paging; where the processing module is further configured to send, on the first paging resource, the first paging message to the UE, where the first paging message is scrambled by using first paging scrambling code, and all the multiple cells use the first paging scrambling code to scramble the first paging message when sending the first paging message.

With reference to the first aspect of the present invention, in a first possible implementation of the first aspect of the present invention, the paging request includes a first sending moment, and the processing module is specifically configured to:

send the first paging indication to the UE according to the first sending moment.

With reference to the first aspect of the present invention, in a second possible implementation of the first aspect of the present invention, the paging request includes a second sending moment, and the processing module is specifically configured to:

send, on the first paging resource, the first paging message to the UE according to the second sending moment.

With reference to the first aspect of the present invention, in a third possible implementation of the first aspect of the present invention, the sending module is further configured to send the first paging scrambling code to the UE.

With reference to any one of the first aspect of the present invention or the first to the third possible implementations of the first aspect of the present invention, in a fourth possible implementation of the first aspect of the present invention, the first paging resource includes a logical channel of a multimedia broadcast multicast service single frequency network MBSFN subframe, and the sending module is specifically configured to:

send a sequence number of the MBSFN subframe and an identifier of the logical channel to the UE.

With reference to the fourth possible implementation of the first aspect of the present invention, in a fifth possible implementation of the first aspect of the present invention, the first paging indication is sent by using a physical downlink control channel PDCCH, and the processing module is specifically configured to:

send the first paging indication to the UE according to the paging request and by using a PDCCH format corresponding to the first paging indication.

With reference to the fourth possible implementation of the first aspect of the present invention, in a sixth possible implementation of the first aspect of the present invention, the processing module is specifically configured to:

mask the first paging indication and send the first paging indication to the UE according to the paging request and by using a first radio network temporary identifier RNTI corresponding to the first paging indication.

A second aspect of the present invention provides UE, including:

a receiving module, configured to receive configuration information that is of a first paging resource and that is sent by a base station, where the first paging resource is a paging resource used when the base station performs paging area paging, the paging area includes multiple cells, and all the multiple cells use the first paging resource to page the UE; where the receiving module is further configured to receive a paging indication sent by the base station; and a processing module, configured to receive, on the first paging resource according to the paging indication and by using first paging scrambling code, a first paging message sent by the base station, where the first paging message is scrambled by using the first paging scrambling code, the first paging message is a paging message used in the paging area paging, and all the multiple cells use the first paging scrambling code to scramble the first paging message when sending the first paging message.

With reference to the second aspect of the present invention, in a first possible implementation of the second aspect of the present invention, the receiving module is further configured to receive the first paging scrambling code sent by the base station.

With reference to the second aspect of the present invention, in a second possible implementation of the second aspect of the present invention, the first paging resource includes a logical channel of an MBSFN subframe, and the receiving module is specifically configured to:

receive a sequence number of the MBSFN subframe and an identifier of the logical channel that are sent by the base station.

With reference to any one of the second aspect of the present invention or the first or the second possible implementation of the second aspect of the present invention, in a third possible implementation of the second aspect of the present invention, the processing module is further configured to:

receive, on a second paging resource indicated by the paging indication, a second paging message according to second paging scrambling code, where the second paging message is scrambled by using the second paging scrambling code, and the second paging message is a paging message used in cell paging.

With reference to any one of the second aspect of the present invention or the first or the second possible implementation of the second aspect of the present invention, in a fourth possible implementation of the second aspect of the present invention, the paging indication is sent by using a PDCCH, and the processing module is specifically configured to:

determine, according to a PDCCH format corresponding to the paging indication, that a paging manner of the base station is the paging area paging, where the PDCCH format corresponding to the paging indication includes a PDCCH format corresponding to a first paging indication and a PDCCH format corresponding to a second paging indication, the first paging indication is used to instruct the UE to receive, on the first paging resource, the first paging message sent by the base station, the second paging indication is used to instruct the UE to receive, on the second paging resource, the second paging message sent by the base station, the second paging resource is a paging resource used when the base station performs cell paging, and the second paging message is the paging message used in the cell paging; and receive, on the first paging resource by using the first paging scrambling code, the first paging message sent by the base station.

With reference to the fourth possible implementation of the second aspect of the present invention, in a fifth possible implementation of the second aspect of the present invention, if the UE determines, according to the PDCCH format corresponding to the paging indication, that the paging manner of the base station is the cell paging, the processing module is further configured to:

receive, on the second paging resource by using second paging scrambling code, the second paging message sent by the base station, where the second paging message is scrambled by using the second paging scrambling code.

With reference to any one of the second aspect of the present invention or the first or the second possible implementation of the second aspect of the present invention, in a sixth possible implementation of the second aspect of the present invention, the processing module is specifically configured to:

receive the paging indication by using a first RNTI corresponding to a first paging indication, where the first paging indication is used to instruct the UE to receive, on the first paging resource, the first paging message sent by the base station.

A third aspect of the present invention provides a paging message sending method, including:

sending, by a base station, configuration information of a first paging resource to UE, where the first paging resource is a paging resource used when the base station performs paging area paging, the paging area includes multiple cells, and all the multiple cells use the first paging resource to page the UE;

receiving, by the base station, a paging request sent by a core network;

sending, by the base station, a first paging indication to the UE according to the paging request, where the first paging indication is used to instruct the UE to receive, on the first paging resource, a first paging message sent by the base station, and the first paging message is a paging message used in the paging area paging; and sending, by the base station on the first paging resource, the first paging message to the UE, where the first paging message is scrambled by using first paging scrambling code, and all the multiple cells use the first paging scrambling code to scramble the first paging message when sending the first paging message.

With reference to the third aspect of the present invention, in a first possible implementation of the third aspect of the present invention, the paging request includes a first sending moment, and the sending, by the base station, a first paging indication to the UE according to the paging request includes:

sending, by the base station, the first paging indication to the UE according to the first sending moment.

With reference to the third aspect of the present invention, in a second possible implementation of the third aspect of the present invention, the paging request includes a second sending moment, and the sending, by the base station on the first paging resource, the first paging message to the UE includes:

sending, by the base station on the first paging resource, the first paging message to the UE according to the second sending moment.

With reference to the third aspect of the present invention, in a third possible implementation of the third aspect of the present invention, the method further includes:

sending, by the base station, the first paging scrambling code to the UE.

With reference to any one of the third aspect of the present invention or the first to the third possible implementations of the third aspect of the present invention, in a fourth possible implementation of the third aspect of the present invention, the first paging resource includes a logical channel of an MBSFN subframe, and the sending, by a base station, configuration information of a first paging resource to user equipment UE includes:

sending, by the base station, a sequence number of the MBSFN subframe and an identifier of the logical channel to the UE.

With reference to the fourth possible implementation of the third aspect of the present invention, in a fifth possible implementation of the third aspect of the present invention, the first paging indication is sent by using a PDCCH, and the sending, by the base station, a first paging indication to the UE according to the paging request includes:

sending, by the base station, the first paging indication to the UE according to the paging request and by using a PDCCH format corresponding to the first paging indication.

With reference to the fourth possible implementation of the third aspect of the present invention, in a sixth possible implementation of the third aspect of the present invention, the sending, by the base station, a first paging indication to the UE according to the paging request includes:

masking, by the base station, the first paging indication and sending the first paging indication to the UE according to the paging request and by using a first radio network temporary identifier RNTI corresponding to the first paging indication.

A fourth aspect of the present invention provides a paging message receiving method, including:

receiving, by UE, configuration information that is of a first paging resource and that is sent by a base station, where the first paging resource is a paging resource used when the base station performs paging area paging, the paging area includes multiple cells, and all the multiple cells use the first paging resource to page the UE;

receiving, by the UE, a paging indication sent by the base station; and receiving, by the UE on the first paging resource according to the paging indication and by using first paging scrambling code, a first paging message sent by the base station, where the first paging message is scrambled by using the first paging scrambling code, the first paging message is a paging message used in the paging area paging, and all the multiple cells use the first paging scrambling code to scramble the first paging message when sending the first paging message.

With reference to the fourth aspect of the present invention, in a first possible implementation of the fourth aspect of the present invention, before the receiving, by the UE on the first paging resource according to the paging indication and by using first paging scrambling code, a first paging message sent by the base station, the method further includes:

receiving, by the UE, the first paging scrambling code sent by the base station.

With reference to the fourth aspect of the present invention, in a second possible implementation of the fourth aspect of the present invention, the first paging resource includes a logical channel of an MBSFN subframe, and the receiving, by UE, configuration information that is of a first paging resource and that is sent by a base station includes:

receiving, by the UE, a sequence number of the MBSFN subframe and an identifier of the logical channel that are sent by the base station.

With reference to any one of the fourth aspect of the present invention or the first or the second possible implementation of the fourth aspect of the present invention, in a third possible implementation of the fourth aspect of the present invention, the method further includes:

receiving, by the UE on a second paging resource indicated by the paging indication, a second paging message according to second paging scrambling code, where the second paging message is scrambled by using the second paging scrambling code, and the second paging message is a paging message used in cell paging.

With reference to any one of the fourth aspect of the present invention or the first or the second possible implementation of the fourth aspect of the present invention, in a fourth possible implementation of the fourth aspect of the present invention, the paging indication is sent by using a PDCCH, and the receiving, by the UE on the first paging resource according to the paging indication and by using first paging scrambling code, a first paging message sent by the base station includes:

determining, by the UE according to a PDCCH format corresponding to the paging indication, that a paging manner of the base station is the paging area paging, where the PDCCH format corresponding to the paging indication includes a PDCCH format corresponding to a first paging indication and a PDCCH format corresponding to a second paging indication, the first paging indication is used to instruct the UE to receive, on the first paging resource, the first paging message sent by the base station, the second paging indication is used to instruct the UE to receive, on the second paging resource, the second paging message sent by the base station, the second paging resource is a paging resource used when the base station performs cell paging, and the second paging message is the paging message used in the cell paging; and receiving, by the UE on the first paging resource by using the first paging scrambling code, the first paging message sent by the base station.

With reference to the fourth possible implementation of the fourth aspect of the present invention, in a fifth possible implementation of the fourth aspect of the present invention, the method further includes:

if the UE determines, according to the PDCCH format corresponding to the paging indication, that the paging manner of the base station is the cell paging, receiving, by the UE on the second paging resource by using second paging scrambling code, the second paging message sent by the base station, where the second paging message is scrambled by using the second paging scrambling code.

With reference to any one of the fourth aspect of the present invention or the first or the second possible implementation of the fourth aspect of the present invention, in a sixth possible implementation of the fourth aspect of the present invention, the receiving, by the UE, a paging indication sent by the base station includes:

receiving, by the UE, the paging indication by using a first RNTI corresponding to a first paging indication, where the first paging indication is used to instruct the UE to receive, on the first paging resource, the first paging message sent by the base station.

According to the paging message sending method, the paging message receiving method, and the device provided in the embodiments of the present invention, a base station sends, to UE, configuration information of a first paging resource reserved by a core network for the UE. When the base station performs paging area paging on the UE, the base station sends, on the first paging resource, a first paging message to the UE. In the embodiments, all multiple cells included in a paging area use the first paging resource to perform paging area paging, and all the multiple cells use same paging scrambling code to scramble the first paging message when sending the first paging message. Therefore, first paging messages sent by the multiple cells do not interfere with each other, and the first paging message received by the UE is superposition of paging signals of multiple paging areas, thereby increasing a paging success rate of the UE.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
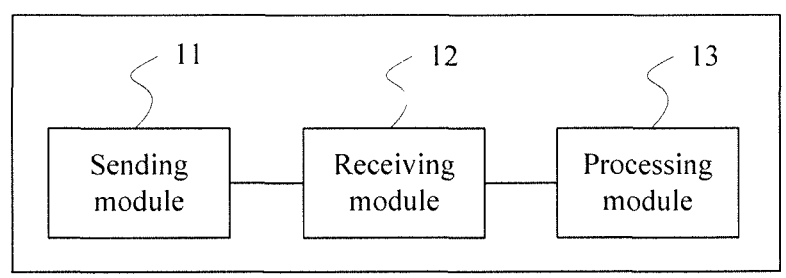
FIG. 1 is a schematic structural diagram of a base station according to Embodiment 1 of the present invention.

FIG. 1 is a schematic structural diagram of a base station according to Embodiment 1 of the present invention. As shown in FIG. 1, the base station provided in this embodiment includes a sending module 11, a receiving module 12, and a processing module 13.

The sending module 11 is configured to send configuration information of a first paging resource to UE. The first paging resource is a paging resource used when the base station performs paging area paging, the paging area includes multiple cells, and all the multiple cells use the first paging resource to page the UE.

In this embodiment, a core network allocates the first paging resource to the UE, and the first paging resource is specially used to perform the paging area paging. The core network sends the configuration information of the first paging resource to the base station, and the base station sends the configuration information of the first paging resource to all UEs in the paging area. The paging area includes the multiple cells. When the UE moves among the multiple cells in the paging area, the core network does not need to be notified. When paging the UE each time, the core network performs paging in an entire paging area, that is, separately pages the UE in the multiple cells included in the paging area. The base station in which each cell is located broadcasts a first paging message in the cell of the base station during paging. The first paging message is the paging message used in the paging area paging, the first paging message includes identifiers of all UEs that need to be paged, and content of first paging messages sent by all the cells is the same.

The paging area may be specifically a tracking area (Tracking Area, TA for short), a location area (Location Area, LA for short), or a routing area (RA for short). The first paging resource includes a frequency resource and a time resource, for example, the time resource is a subframe 0 and a subframe 4 of each radio frame, and the frequency resource is resource blocks 20-30. When the base station in which each cell is located schedules the paging area paging, only the first paging resource can be used to send the first paging message. Optionally, if the base station does not schedule the paging area paging on the first paging resource, the base station may transmit another service by using the first paging resource, so that network resources can be fully used.

Optionally, the first paging resource includes a logical channel of a multimedia broadcast multicast service single frequency network (Multimedia Broadcast multicast service Single Frequency Network, MBSFN for short) subframe. Some subframe sets are specified in the MBSFN, and all the specified subframe sets are consistent in all cells of an entire MBSFN area. All the cells in the MBSFN area transmit a same service on the specified subframe sets. For example, the specified subframe sets are a subframe 5 and a subframe 6 of each radio frame. All the cells in the MBSFN area transmit the same service on the subframe 5 and the subframe 6 of each radio frame, and each subframe in the specified subframe sets is referred to as the MBSFN subframe. One MBSFN subframe is corresponding to multiple logical channels, and each logical channel is used to transmit different services. To send the first paging message on the MBSFN subframe, an MCE needs to configure a logical channel for the base station, and the logical channel is specially configured to send the first paging message.

Correspondingly, the sending module 11 is specifically configured to send a sequence number of the MBSFN subframe and an identifier of the logical channel to the UE. The base station may send the sequence number of the MBSFN subframe and the identifier of the logical channel to the UE by using a multicast channel (Multiple Channel, MCCH for short), so that the UE monitors the first paging message on the logical channel.

The receiving module 12 is configured to receive a paging request sent by the core network.

When the core network needs to establish a service for UE in an idle state, the core network sends the paging request to each cell in the paging area to trigger the paging area paging. Optionally, the paging request includes a first sending moment, so that all base stations in the paging area simultaneously send the first paging indication at the first sending moment. All the base stations in the paging area are the base stations in which respective cells in the paging area are located. Optionally, the paging request includes a second sending moment, so that the cells in the paging area simultaneously send the first paging message at the second sending moment.

The processing module 13 is configured to send the first paging indication to the UE according to the paging request. The first paging indication is used to instruct the UE to receive, on the first paging resource, the first paging message sent by the base station, and the first paging message is the paging message used in the paging area paging.

Optionally, if the paging request includes the first sending moment, the processing module 13 is specifically configured to send the first paging indication to the UE according to the first sending moment. In this embodiment, all the multiple cells in the paging area send the first paging indication to the UE at the first sending moment. This can ensure that all the cells in the paging area simultaneously send the first paging indication to the UE, and prevent the cells from interfering with each other when sending the first paging indication. Optionally, if the paging request includes the second sending moment, the processing module 13 is specifically configured to send, on the first paging resource, the first paging message to the UE according to the second sending moment. In this embodiment, all the cells in the paging area send the first paging message to the UE at the second sending moment. This can ensure that all the cells in the paging area simultaneously send the first paging message to the UE, prevent the cells from interfering with each other when sending the first paging message, and increase a paging success rate of the UE.

Optionally, a PDCCH format corresponding to the first paging indication is the same as a PDCCH format corresponding to a second paging indication, and a first radio network temporary identifier (RNTI for short) that is used to mask the first paging indication is the same as a second RNTI that is used to mask the second paging indication. The second paging indication is used to instruct the UE to receive, on a second paging resource, a second paging message sent by the base station. The second paging resource is a paging resource used when the base station performs cell paging, and the second paging message is a paging message used in the cell paging. Paging ranges of the cell paging and the paging area paging are different. A paging range of the cell paging is one cell, and a paging range of the paging area paging is multiple cells. In this embodiment, the first paging resource can be used only in the paging area paging, and the second paging resource can be used only in the cell paging. A paging manner of the cell paging is the same as that in the prior art, and the second paging resource used in the cell paging is a physical downlink shared channel (Physical Downlink Shared Channel, PDSCH for short).

Because the PDCCH format corresponding to the first paging indication is the same as the PDCCH format corresponding to the second paging indication, and the first RNTI is the same as the second RNTI, after receiving the paging indication, the UE cannot distinguish whether the received paging indication is the first paging indication or the second paging indication, that is, the UE cannot determine whether a current paging manner is the paging area paging or the cell paging. In this case, the UE does not know whether to receive the paging message on the first paging resource or on the second paging resource. To ensure that the UE does not miss the first paging message, the UE needs to receive the paging message both on the first paging resource and on the second paging resource. After receiving the paging message, the UE determines, according to content of the paging message, whether the first paging message or the second paging message is received.

Optionally, a PDCCH format corresponding to the first paging indication is different from a PDCCH format corresponding to a second paging indication, and the base station and the UE distinguish the paging area paging and the cell paging according to the PDCCH format corresponding to the paging indication. In this manner, the base station may use a same RNTI to mask the first paging indication and the second paging indication. For example, the base station uses an existing second RNTI that is used to mask the second paging indication to mask the first paging indication and the second paging indication. When the base station performs the paging area paging, the processing module 13 is specifically configured to send the first paging indication to the UE according to the paging request and by using the PDCCH format corresponding to the first paging indication. After receiving the paging indication, the UE determines, according to a PDCCH format corresponding to the received paging indication, whether the paging indication is the first paging indication or the second paging indication. If the paging indication received by the UE is the first paging indication, it indicates that the current paging manner is the paging area paging, and the UE receives, on the first paging resource, the first paging message sent by the base station. If the paging indication received by the UE is the second paging indication, it indicates that the current paging manner is the cell paging, and the UE receives, on the second paging resource indicated by the second paging indication, the second paging message sent by the base station.

Optionally, a first RNTI that is used to mask the first paging indication is different from a second RNTI that is used to mask a second paging indication. The base station and the UE distinguish the first paging indication and the second paging indication according to the first RNTI and the second RNTI. If the base station performs the paging area paging, the processing module 13 is specifically configured to mask the first paging indication and send the first paging indication to the UE according to the paging request and by using the first RNTI corresponding to the first paging indication. At a receive end, the UE receives the paging indication according to the first RNTI. If the UE receives the paging indication according to the first RNTI, it indicates that the paging indication received by the UE is the first paging indication, and the UE receives, on the first paging resource, the first paging message sent by the base station. If the UE does not receive the paging indication by using the first RNTI, it indicates that the paging indication received by the UE is the second paging indication, and the UE receives, on the second paging resource, the second paging message sent by the base station.

The processing module 13 is further configured to send, on the first paging resource, the first paging message to the UE. The first paging message is scrambled by using first paging scrambling code, and all the multiple cells use the first paging scrambling code to scramble the first paging message when sending the first paging message.

In this embodiment, all the cells in the paging area use the first paging scrambling code to scramble the first paging message, and send, on the first paging resource, the scrambled first paging message to the UE. Therefore, first paging messages sent by the multiple cells do not interfere with each other, and the first paging message received by the UE is superposition of paging signals of multiple paging areas, thereby increasing a paging success rate of the UE. In specific implementation, the sending module 11 determines the first paging resource according to a distribution diagram of specific reference symbols of the first paging resource. The distribution diagram of the specific reference symbols of the first paging resource specifically specifies the frequency resource and the time resource of the first paging resource.

In this embodiment, a base station sends, to UE, configuration information of a first paging resource reserved by a core network for the UE. When the base station performs paging area paging on the UE, the base station sends, on the first paging resource, a first paging message to the UE. In this embodiment, all multiple cells included in a paging area use the first paging resource to perform paging area paging, and all the multiple cells use same first paging scrambling code to scramble the first paging message when sending the first paging message. Therefore, first paging messages sent by the multiple cells do not interfere with each other, and the first paging message received by the UE is superposition of paging signals of multiple paging areas, thereby increasing a paging success rate of the UE.

Figure 2:
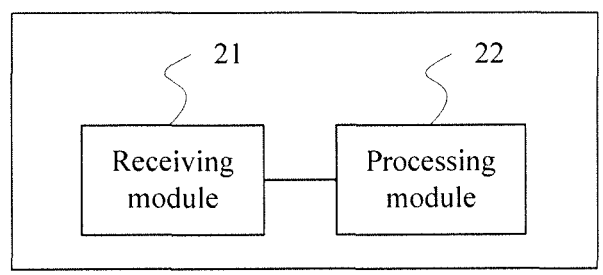
FIG. 2 is a schematic structural diagram of UE according to Embodiment 2 of the present invention.

FIG. 2 is a schematic structural diagram of UE according to Embodiment 2 of the present invention. As shown in FIG. 2, the UE provided in this embodiment includes a receiving module 21 and a processing module 22.

The receiving module 21 is configured to receive configuration information that is of a first paging resource and that is sent by a base station. The first paging resource is a paging resource used when the base station performs paging area paging, the paging area includes multiple cells, and all the multiple cells use the first paging resource to page the UE.

Optionally, the first paging resource includes a logical channel of an MBSFN subframe, and the receiving module 21 is specifically configured to receive a sequence number of the MBSFN subframe and an identifier of the logical channel that are sent by the base station. Subsequently, the UE receives, according to the sequence number of the MBSFN subframe and the identifier of the logical channel, a first paging message sent by the base station.

The receiving module 21 is further configured to receive a paging indication sent by the base station.

The processing module 22 is configured to receive, on the first paging resource according to the paging indication and by using first paging scrambling code, the first paging message sent by the base station. The first paging message is scrambled by using the first paging scrambling code, the first paging message is a paging message used in the paging area paging, and all the multiple cells use the first paging scrambling code to scramble the first paging message when sending the first paging message.

Specifically, the processing module 22 receives the first paging message in the following three manners:

(1) A PDCCH format corresponding to a first paging indication is the same as a PDCCH format corresponding to a second paging indication, and a first RNTI that is used to mask the first paging indication is the same as a second RNTI that is used to mask the second paging indication. In this case, the processing module 22 is specifically configured to receive, separately on the first paging resource and on a second paging resource according to the paging indication and by using the first paging scrambling code, the first paging message sent by the base station. The processing module 22 is further configured to receive, on the second paging resource indicated by the paging indication, a second paging message according to second paging scrambling code. The second paging message is scrambled by using the second paging scrambling code, and the second paging message is a paging message used in cell paging.

(2) If a PDCCH format corresponding to a first paging indication is different from a PDCCH format corresponding to a second paging indication, the base station and the UE distinguish the paging area paging and the cell paging according to the PDCCH format corresponding to the paging indication. The processing module 22 is specifically configured to determine, according to the PDCCH format corresponding to the paging indication, that a paging manner of the base station is the paging area paging. For example, the PDCCH format corresponding to the first paging indication that is corresponding to the paging area is 1A, the PDCCH format corresponding to the second paging indication is 1C, and the processing module 22 determines whether the PDCCH format corresponding to the paging indication received by the receiving module 21 is 1A or 1C. If the PDCCH format corresponding to the received paging indication is 1A, the processing module 22 determines that a current paging manner is the paging area paging, and the processing module 22 receives, on the first paging resource by using the first paging scrambling code, the first paging message sent by the base station. If the PDCCH format corresponding to the received paging indication is 1C, the processing module 22 determines that a current paging manner is the cell paging, and the processing module 22 is further configured to receive, on a second paging resource by using second paging scrambling code, a second paging message sent by the base station.

(3) If a first paging indication is masked by using a first RNTI, and the first RNTI is different from a second RNTI that is used to mask a second paging indication, the base station and the UE distinguish the first paging indication and the second paging indication according to the first RNTI and the second RNTI. The receiving module 21 is specifically configured to receive the paging indication by using the first RNTI corresponding to the first paging indication. If the receiving module 21 successfully receives the paging indication by using the first RNTI, it is determined that the paging indication is the first paging indication and a current paging manner is the paging area paging, and the UE receives, on the first paging resource by using the first paging scrambling code, the first paging message sent by the base station. If the UE does not receive the paging indication by using the first RNTI, the UE determines that the paging indication is the second paging indication and a current paging manner is the cell paging, and the UE receives, on a second paging resource by using second paging scrambling code, a second paging message sent by the base station.

In this embodiment, UE receives configuration information that is of a first paging resource and that is sent by a base station, and the first paging resource is a paging resource used when the base station performs paging area paging. When the base station needs to perform the paging area paging, the base station sends a paging indication to the UE. The UE receives, on the first paging resource according to the received paging indication and by using first paging scrambling code, a first paging message that is scrambled by using the first paging scrambling code and that is sent by the base station. In this embodiment, all multiple cells included in a paging area use the first paging resource to perform paging area paging, and all the multiple cells use the first paging scrambling code to scramble the first paging message when sending the first paging message. Therefore, first paging messages sent by the multiple cells do not interfere with each other, and the first paging message received by the UE is superposition of paging signals of multiple paging areas, thereby increasing a paging success rate of the UE.

Figure 3:
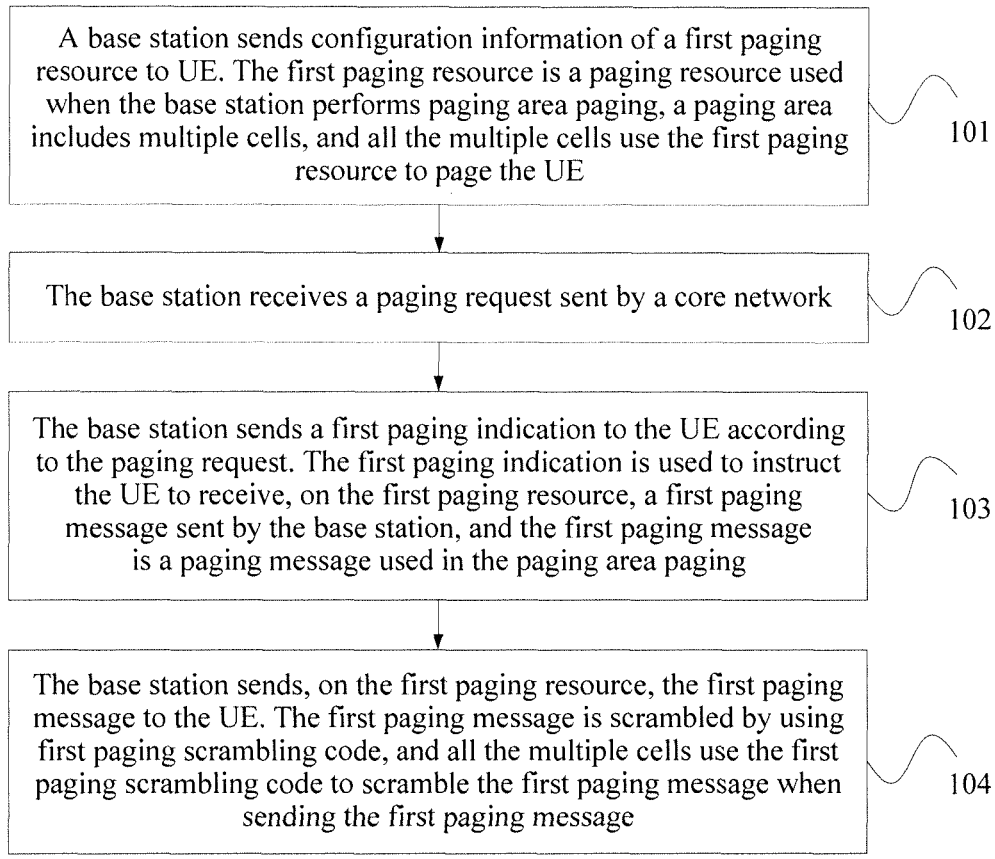
FIG. 3 is a flowchart of a paging message sending method according to Embodiment 3 of the present invention.

FIG. 3 is a flowchart of a paging message sending method according to Embodiment 3 of the present invention. As shown in FIG. 3, the method in this embodiment may include the following steps.

Step 101: A base station sends configuration information of a first paging resource to UE. The first paging resource is a paging resource used when the base station performs paging area paging, the paging area includes multiple cells, and all the multiple cells use the first paging resource to page the UE.

In this embodiment, a core network allocates the first paging resource to the UE, and the first paging resource is specially used to perform the paging area paging. The paging area includes the multiple cells. When the UE moves among the multiple cells in the paging area, the core network does not need to be notified. When paging the UE each time, the core network performs paging in an entire paging area, that is, separately pages the UE in the multiple cells included in the paging area. The base station in which each cell is located broadcasts a first paging message in the cell of the base station during paging. The first paging message is the paging message used in the paging area paging, the first paging message includes identifiers of all UEs that need to be paged, and content of first paging messages sent by all the cells is the same.

The paging area may be specifically a TA, an LA, or an RA. The first paging resource includes a frequency resource and a time resource. When the base station in which each cell is located schedules the paging area paging, only the first paging resource can be used to send the first paging message. Optionally, if the base station does not schedule the paging area paging on the first paging resource, the base station may transmit another service by using the first paging resource, so that network resources can be fully used.

Optionally, the first paging resource includes a logical channel of an MBSFN subframe. Correspondingly, that a base station sends configuration information of a first paging resource to UE is specifically: the base station sends a sequence number of the MBSFN subframe and an identifier of the logical channel to the UE.

Step 102: The base station receives a paging request sent by a core network.

When the core network needs to establish a service for UE in an idle state, the core network sends the paging request to each cell in the paging area to trigger the paging area paging.

Optionally, the paging request includes a first sending moment, so that the base station sends a first paging indication to the UE according to the first sending moment. Optionally, the paging request includes a second sending moment, so that the base station sends, on the first paging resource, the first paging message to the UE according to the second sending moment.

Step 103: The base station sends a first paging indication to the UE according to the paging request. The first paging indication is used to instruct the UE to receive, on the first paging resource, a first paging message sent by the base station, and the first paging message is a paging message used in the paging area paging.

After receiving the paging request sent by a network side, the base station sends, on a PDCCH, the first paging indication to the UE according to the paging request.

Optionally, if the paging request includes the first sending moment, when the first sending moment arrives, the base station sends the first paging indication to the UE. In this embodiment, all the cells in the paging area send the first paging indication to the UE at the first sending moment.

Optionally, a PDCCH format corresponding to the first paging indication is the same as a PDCCH format corresponding to a second paging indication, and a first RNTI that is used to mask the first paging indication is the same as a second RNTI that is used to mask the second paging indication. The second paging indication is used to instruct the UE to receive, on a second paging resource, a second paging message sent by the base station. The second paging resource is a paging resource used when the base station performs cell paging, and the second paging message is a paging message used in the cell paging. Paging ranges of the cell paging and the paging area paging are different. A paging range of the cell paging is one cell, and a paging range of the paging area paging is multiple cells. In this embodiment, the first paging resource can be used only in the paging area paging, and the second paging resource can be used only in the cell paging.

Because the PDCCH format corresponding to the first paging indication is the same as the PDCCH format corresponding to the second paging indication, and the first RNTI is the same as the second RNTI, after receiving the paging indication, the UE cannot distinguish whether the received paging indication is the first paging indication or the second paging indication, that is, the UE cannot determine whether a current paging manner is the paging area paging or the cell paging. In this case, the UE does not know whether to receive the paging message on the first paging resource or on the second paging resource. To ensure that the UE does not miss the first paging message, the UE receives the paging message both on the first paging resource and on the second paging resource. After receiving the paging message, the UE determines, according to content of the paging message, whether the received paging message is the first paging message or the second paging message.

Optionally, a PDCCH format corresponding to the first paging indication is different from a PDCCH format corresponding to a second paging indication, and the base station and the UE distinguish the paging area paging and the cell paging according to the PDCCH format corresponding to the paging indication. In this manner, the base station may use a same RNTI to mask the first paging indication and the second paging indication. For example, the base station uses an existing second RNTI that is used to mask the second paging indication to mask the first paging indication and the second paging indication. When the base station performs the paging area paging, that the base station sends a first paging indication to the UE according to the paging request is specifically: the base station sends the first paging indication to the UE according to the paging request and by using the PDCCH format corresponding to the first paging indication. After receiving the paging indication, the UE determines, according to a PDCCH format corresponding to the received paging indication, whether the paging indication is the first paging indication or the second paging indication. If the paging indication received by the UE is the first paging indication, it indicates that the current paging manner is the paging area paging, and the UE receives, on the first paging resource, the first paging message sent by the base station. If the paging indication received by the UE is the second paging indication, it indicates that the current paging manner is the cell paging, and the UE receives, on the second paging resource indicated by the second paging indication, the second paging message sent by the base station.

Optionally, the first paging indication is masked by using a first RNTI, and the first RNTI is different from a second RNTI that is used to mask a second paging indication. The base station and the UE distinguish the first paging indication and the second paging indication according to the first RNTI and the second RNTI. If the paging area paging needs to be performed, that the base station sends a first paging indication to the UE according to the paging request is specifically: the base station masks the first paging indication and sends the first paging indication to the UE according to the paging request and by using the first RNTI corresponding to the first paging indication. At a receive end, the UE receives the paging indication according to the first RNTI. If the UE receives the paging indication according to the first RNTI, it indicates that the paging indication received by the UE is the first paging indication, and the UE receives, on the first paging resource, the first paging message sent by the base station.

Step 104: The base station sends, on the first paging resource, the first paging message to the UE. The first paging message is scrambled by using first paging scrambling code, and all the multiple cells use the first paging scrambling code to scramble the first paging message when sending the first paging message.

In this embodiment, all the cells in the paging area use same paging scrambling code to scramble the first paging message, and send, on the first paging resource, the scrambled first paging message to the UE. Therefore, first paging messages sent by the multiple cells do not interfere with each other, and the first paging message received by the UE is superposition of paging signals of multiple paging areas, thereby increasing a paging success rate of the UE. In specific implementation, the base station determines the first paging resource according to a distribution diagram of specific reference symbols of the first paging resource. The distribution diagram of the specific reference symbols of the first paging resource specifically specifies the frequency resource and the time resource of the first paging resource.

In this embodiment, a base station sends, to UE, configuration information of a first paging resource reserved by a network side for the UE. When the base station needs to perform paging area paging, the base station sends, on the first paging resource, a first paging message to the UE. In this embodiment, all multiple cells included in a paging area use the first paging resource to perform paging area paging, and all the multiple cells use same paging scrambling code to scramble the first paging message when sending the first paging message. Therefore, first paging messages sent by the multiple cells do not interfere with each other, and the first paging message received by the UE is superposition of paging signals of multiple paging areas, thereby increasing a paging success rate of the UE.

Figure 4:
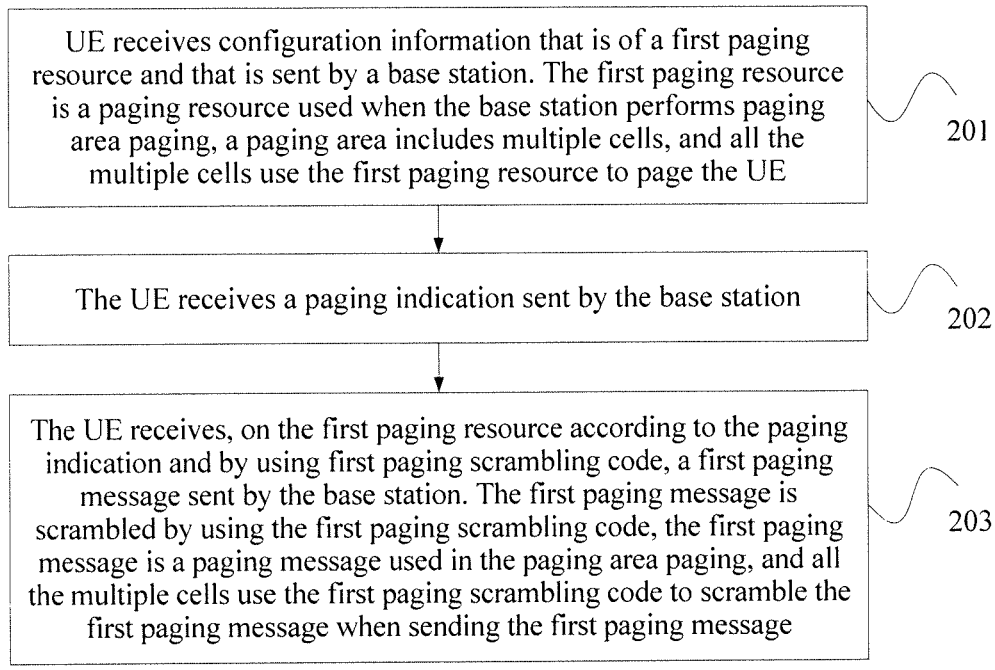
FIG. 4 is a flowchart of a paging message receiving method according to Embodiment 4 of the present invention.

FIG. 4 is a flowchart of a paging message receiving method according to Embodiment 4 of the present invention. As shown in FIG. 4, the method provided in this embodiment may include the following steps.

Step 201: UE receives configuration information that is of a first paging resource and that is sent by a base station. The first paging resource is a paging resource used when the base station performs paging area paging, the paging area includes multiple cells, and all the multiple cells use the first paging resource to page the UE.

Optionally, the first paging resource is a logical channel of an MBSFN subframe, and that UE receives configuration information that is of a first paging resource and that is sent by a base station is specifically: the UE receives a sequence number of the MBSFN subframe and an identifier of the logical channel that are sent by the base station. Subsequently, the UE receives, according to the sequence number of the MBSFN subframe and the identifier of the logical channel, a first paging message sent by the base station.

Step 202: The UE receives a paging indication sent by the base station.

Step 203: The UE receives, on the first paging resource according to the paging indication and by using first paging scrambling code, a first paging message sent by the base station. The first paging message is scrambled by using the first paging scrambling code, the first paging message is a paging message used in the paging area paging, and all the multiple cells use the first paging scrambling code to scramble the first paging message when sending the first paging message.

Specifically, the UE receives the first paging message in the following three manners:

(1) A PDCCH format corresponding to a first paging indication is the same as a PDCCH format corresponding to a second paging indication, and a first RNTI that is used to mask the first paging indication is the same as a second RNTI that is used to mask the second paging indication. In this case, the UE receives, separately on the first paging resource and on a second paging resource according to the paging indication and by using the first paging scrambling code, the first paging message sent by the base station. The UE further receives, on the second paging resource indicated by the paging indication, a second paging message according to second paging scrambling code. The second paging message is scrambled by using the second paging scrambling code, the second paging message is a paging message used in cell paging, and the second paging resource is a paging resource used when the base station performs the cell paging.

(2) If a PDCCH format corresponding to a first paging indication is different from a PDCCH format corresponding to a second paging indication, the base station and the UE distinguish the paging area paging and the cell paging according to the PDCCH format corresponding to the paging indication. That the UE receives, on the first paging resource according to the paging indication and by using first paging scrambling code, a first paging message sent by the base station is specifically: the UE determines, according to the PDCCH format corresponding to the paging indication, that a paging manner of the base station is the paging area paging. The PDCCH format corresponding to the paging indication includes the PDCCH format corresponding to the first paging indication and the PDCCCH format corresponding to the second paging indication. The first paging indication is used to instruct the UE to receive, on the first paging resource, the first paging message sent by the base station, and the second paging indication is used to instruct the UE to receive, on a second paging resource, a second paging message sent by the base station. For example, the PDCCH format corresponding to the first paging indication is 1A, the PDCCH format corresponding to the second paging indication is 1C, and the UE determines whether the PDCCH format corresponding to the received paging indication is 1A or 1C. If the PDCCH format corresponding to the paging indication received by the UE is 1A, the UE determines that a current paging manner is the paging area paging, and the UE receives, on the first paging resource by using the first paging scrambling code, the first paging message sent by the base station. If the PDCCH format corresponding to the paging indication received by the UE is 1C, the UE determines that a current paging manner is the cell paging, and the UE receives, on the second paging resource by using second paging scrambling code, the second paging message sent by the base station.

(3) If a first RNTI that is used to mask a first paging indication is different from a second RNTI that is used to mask a second paging indication, the base station and the UE distinguish the first paging indication and the second paging indication according to the first RNTI and the second RNTI. That the UE receives a paging indication sent by the base station is specifically: the UE receives the paging indication by using the first RNTI corresponding to the first paging indication. If the UE successfully receives the paging indication by using the first RNTI, the UE determines that the paging indication is the first paging indication and a current paging manner is the paging area paging, and the UE receives, on the first paging resource by using the first paging scrambling code, the first paging message sent by the base station. If the UE does not receive the paging indication by using the first RNTI, the UE determines that the paging indication is the second paging indication and a current paging manner is the cell paging, and the UE receives, on a second paging resource by using second paging scrambling code, a second paging message sent by the base station.

In this embodiment, UE receives configuration information of a first paging resource reserved by a core network for the UE. When a base station performs paging area paging on the UE, the base station sends a paging indication to the UE. The UE receives, on the first paging resource according to the received paging indication and by using first paging scrambling code, a first paging message that is scrambled by using the first paging scrambling code and that is sent by the base station. In this embodiment, all multiple cells included in a paging area use the first paging resource to perform paging area paging, and all the multiple cells use same paging scrambling code to scramble the first paging message when sending the first paging message. Therefore, first paging messages sent by the multiple cells do not interfere with each other, and the first paging message received by the UE is superposition of paging signals of multiple paging areas, thereby increasing a paging success rate of the UE.

Figure 5:
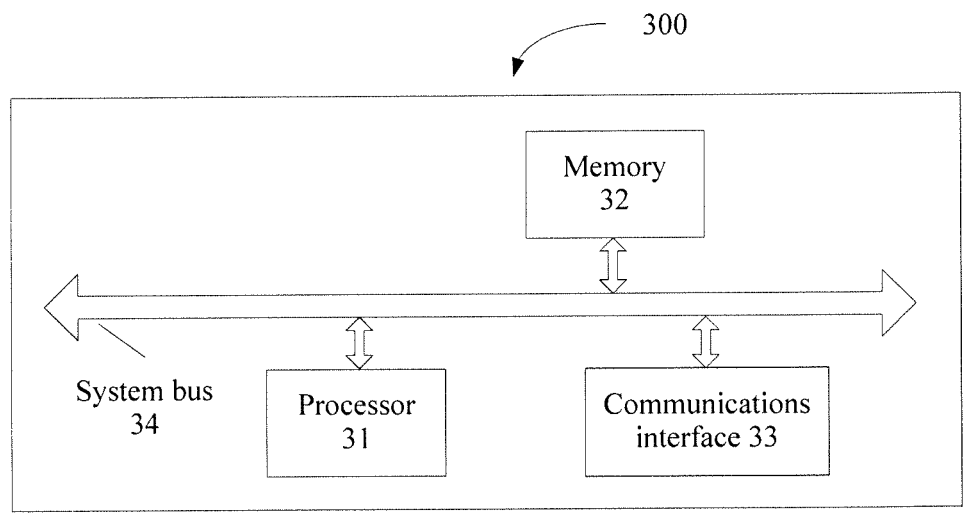
FIG. 5 is a schematic structural diagram of a base station according to Embodiment 5 of the present invention.

FIG. 5 is a schematic structural diagram of a base station according to Embodiment 5 of the present invention. As shown in FIG. 5, a base station 300 provided in this embodiment includes a processor 31, a memory 32, a communications interface 33, and a communications bus 34. The memory 32 and the communications interface 33 are connected to the processor 31 by using the communications bus 34. The memory 32 is configured to store a computer instruction, the communications interface 33 is configured to communicate with another device, and the processor 31 is configured to execute the computer instruction stored in the memory 32 to execute the following method:

sending configuration information of a first paging resource to UE, where the first paging resource is a paging resource used when the base station performs paging area paging, the paging area includes multiple cells, and all the multiple cells use the first paging resource to page the UE;

receiving a paging request sent by a core network;

sending a first paging indication to the UE according to the paging request, where the first paging indication is used to instruct the UE to receive, on the first paging resource, a first paging message sent by the base station, and the first paging message is a paging message used in the paging area paging; and sending, on the first paging resource, the first paging message to the UE, where the first paging message is scrambled by using first paging scrambling code, and all the multiple cells use the first paging scrambling code to scramble the first paging message when sending the first paging message.

Optionally, the paging request includes a first sending moment, and the sending a first paging indication to the UE according to the paging request includes: sending the first paging indication to the UE according to the first sending moment.

Optionally, the paging request includes a second sending moment, and the sending, on the first paging resource, the first paging message to the UE includes: sending, on the first paging resource, the first paging message to the UE according to the second sending moment.

Further, the processor 31 is further configured to send the first paging scrambling code to the UE.

Optionally, the first paging resource includes a logical channel of an MBSFN subframe, and the sending configuration information of a first paging resource to UE includes: sending a sequence number of the MBSFN subframe and an identifier of the logical channel to the UE.

Optionally, the first paging indication is sent by using a PDCCH, and the sending a first paging indication to the UE according to the paging request includes: sending the first paging indication to the UE according to the paging request and by using a PDCCH format corresponding to the first paging indication.

Optionally, the sending a first paging indication to the UE according to the paging request includes: masking the first paging indication and sending the first paging indication to the UE according to the paging request and by using a first RNTI corresponding to the first paging indication.

The base station 300 provided in this embodiment can be configured to execute the method in Embodiment 3. Specific implementations and technical effects are similar, and details are not described herein again.

Figure 6:
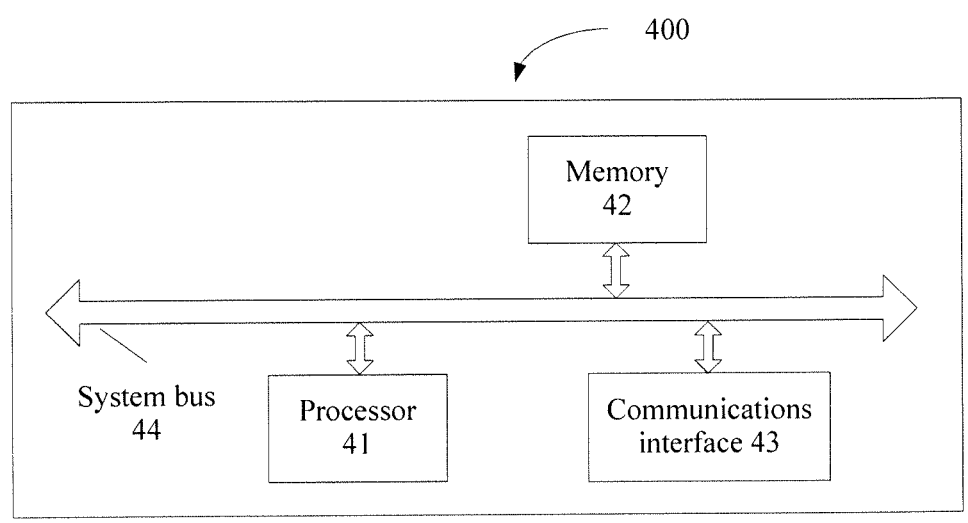
FIG. 6 is a schematic structural diagram of UE according to Embodiment 6 of the present invention.

FIG. 6 is a schematic structural diagram of UE according to Embodiment 6 of the present invention. As shown in FIG. 6, UE 400 provided in this embodiment includes a processor 41, a memory 42, a communications interface 43, and a communications bus 44. The memory 42 and the communications interface 43 are connected to the processor 41 by using the communications bus 44. The memory 42 is configured to store a computer instruction, the communications interface 43 is configured to communicate with another device, and the processor 41 is configured to execute the computer instruction stored in the memory 42 to execute the following method:

receiving configuration information that is of a first paging resource and that is sent by a base station, where the first paging resource is a paging resource used when the base station performs paging area paging, the paging area includes multiple cells, and all the multiple cells use the first paging resource to page the UE;

receiving a paging indication sent by the base station; and receiving, on the first paging resource according to the paging indication and by using first paging scrambling code, a first paging message sent by the base station, where the first paging message is scrambled by using the first paging scrambling code, the first paging message is a paging message used in the paging area paging, and all the multiple cells use the first paging scrambling code to scramble the first paging message when sending the first paging message.

Further, before the receiving, by the UE on the first paging resource according to the paging indication and by using first paging scrambling code, a first paging message sent by the base station, the processor 41 is further configured to receive the first paging scrambling code sent by the base station.

Optionally, the first paging resource includes a logical channel of an MBSFN subframe, and the receiving configuration information that is of a first paging resource and that is sent by a base station includes: receiving a sequence number of the MBSFN subframe and an identifier of the logical channel that are sent by the base station.

Optionally, the processor 41 is further configured to receive, on a second paging resource indicated by the paging indication, a second paging message according to second paging scrambling code. The second paging message is scrambled by using the second paging scrambling code, and the second paging message is a paging message used in cell paging.

Optionally, the paging indication is sent by using a PDCCH, and the receiving, on the first paging resource according to the paging indication and by using first paging scrambling code, a first paging message sent by the base station includes: determining, according to a PDCCH format corresponding to the paging indication, that a paging manner of the base station is the paging area paging. The PDCCH format corresponding to the paging indication includes a PDCCH format corresponding to a first paging indication and a PDCCH format corresponding to a second paging indication, the first paging indication is used to instruct the UE to receive, on the first paging resource, the first paging message sent by the base station, the second paging indication is used to instruct the UE to receive, on the second paging resource, the second paging message sent by the base station, the second paging resource is a paging resource used when the base station performs the cell paging, and the second paging message is the paging message used in the cell paging; and receiving, on the first paging resource by using the first paging scrambling code, the first paging message sent by the base station. If it is determined, according to the PDCCH format corresponding to the paging indication, that the paging manner of the base station is the cell paging, the processor 41 receives, on the second paging resource by using the second paging scrambling code, the second paging message sent by the base station. The second paging message is scrambled by using the second paging scrambling code.

Optionally, the receiving a paging indication sent by the base station includes: receiving the paging indication by using a first RNTI corresponding to the first paging indication. The first paging indication is used to instruct the UE to receive, on the first paging resource, the first paging message sent by the base station.

The UE 400 provided in this embodiment can be configured to execute the method in Embodiment 4. Specific implementations and technical effects are similar, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An apparatus, comprising:
a non-transitory memory comprising instructions; and
a processor in communication with the memory, wherein the processor executes the instructions to:
send configuration information of a first paging resource to user equipment (UE), wherein the first paging resource is a paging resource used when a base station performs paging area paging, the paging area comprises multiple cells, and all the multiple cells, each having a respective base station, use the first paging resource to page the UE;
receive a paging request sent by a core network, wherein the paging request received by the processor includes information of a first sending moment and a second sending moment, the first sending moment being a time that each of the base stations is to simultaneously send a first paging indication to the UE and the second sending moment being a time that each of the base stations is to simultaneously send a first paging message to the UE; and
send the first paging indication to the UE according to the paging request at the first sending moment, wherein the first paging indication is used to instruct the UE to receive, on the first paging resource, the first paging message sent by the base station, and the first paging message is a paging message used in the paging area paging; wherein
the processor is further configured to send, on the first paging resource, the first paging message to the UE at the second sending moment, wherein the first paging message is scrambled by using a first paging scrambling code, and all the multiple cells each having the respective base station use the first paging scrambling code to scramble the first paging message when sending the first paging message.

2. The apparatus according to claim 1, wherein the processor is further configured to send the first paging scrambling code to the UE.

3. The apparatus according to claim 1, wherein the first paging resource comprises a logical channel of a multimedia broadcast multicast service single frequency network (MBSFN) subframe, and the processor is configured to:
send a sequence number of the MBSFN subframe and an identifier of the logical channel to the UE.

4. The apparatus according to claim 3, wherein the first paging indication is sent by using a physical downlink control channel (PDCCH), and the processor is configured to:
send the first paging indication to the UE according to the paging request and by using a PDCCH format corresponding to the first paging indication.

5. The apparatus according to claim 3, wherein the processor is configured to:
mask the first paging indication and send the first paging indication to the UE according to the paging request and by using a first radio network temporary identifier RNTI corresponding to the first paging indication.

6. An apparatus, comprising:
a non-transitory memory comprising instructions; and
a processor in communication with the memory, wherein the processor is configured to execute the instructions to:
receive configuration information that is of a first paging resource and that is sent by a base station, wherein the first paging resource is a paging resource used when the base station performs paging area paging, the paging area comprises multiple cells each having a respective base station, and all the multiple cells each having the respective base station use the first paging resource to page a user equipment (UE);
receive a paging indication sent by the base station at a first sending moment which is a time that each of the base stations simultaneously send the paging indication to the UE; and
receive, on the first paging resource according to the paging indication and by using a first paging scrambling code, a first paging message sent by the base station at a second sending moment which is a time that each of the base stations simultaneously send the first paging message to the UE, wherein the first paging message is scrambled by using the first paging scrambling code, the first paging message is a paging message used in the paging area paging, and all the multiple cells each having the respective base station use the first paging scrambling code to scramble the first paging message when sending the first paging message.

7. The apparatus according to claim 6, wherein the processor is further configured to receive the first paging scrambling code sent by the base station.

8. The apparatus according to claim 6, wherein the first paging resource comprises a logical channel of a multimedia broadcast multicast service single frequency network MBSFN subframe, and the processor is configured to:
receive a sequence number of the MBSFN subframe and an identifier of the logical channel that are sent by the base station.

9. The apparatus according to claim 6, wherein the processor is further configured to:
receive, on a second paging resource indicated by the paging indication, a second paging message according to a second paging scrambling code, wherein the second paging message is scrambled by using the second paging scrambling code, and the second paging message is a paging message used in cell paging.

10. The apparatus according to claim 6, wherein the paging indication is sent by using a physical downlink control channel PDCCH, and the processor is configured to:
determine, according to a PDCCH format corresponding to the paging indication, that a paging manner of the base station is the paging area paging, wherein the PDCCH format corresponding to the paging indication comprises a PDCCH format corresponding to a first paging indication and a PDCCH format corresponding to a second paging indication, the first paging indication is used to instruct the UE to receive, on the first paging resource, the first paging message sent by the base station, the second paging indication is used to instruct the UE to receive, on the second paging resource, the second paging message sent by the base station, the second paging resource is a paging resource used when the base station performs cell paging, and the second paging message is the paging message used in the cell paging; and
receive, on the first paging resource by using the first paging scrambling code, the first paging message sent by the base station.

11. The apparatus according to claim 10, wherein if it is determined, according to the PDCCH format corresponding to the paging indication, that the paging manner of the base station is the cell paging, the processor is further configured to:
receive, on the second paging resource by using a second paging scrambling code, the second paging message sent by the base station, wherein the second paging message is scrambled by using the second paging scrambling code.

12. The apparatus according to claim 6, wherein the processor is configured to:
receive the paging indication by using a first radio network temporary identifier RNTI corresponding to a first paging indication, wherein the first paging indication is used to instruct the UE to receive, on the first paging resource, the first paging message sent by the base station.

13. A paging message sending method, comprising:
sending, by an apparatus, configuration information of a first paging resource to user equipment (UE), wherein the first paging resource is a paging resource used when a base station performs paging area paging, the paging area comprises multiple cells, each having a respective base station, and all the multiple cells each having the respective base station use the first paging resource to page the UE;
receiving, by the apparatus, a paging request sent by a core network, wherein the paging request received by the apparatus includes information of a first sending moment and a second sending moment, the first sending moment being a time that each of the base stations is to simultaneously send a first paging indication to the UE and the second sending moment being a time that each of the base stations is to simultaneously send a first paging message to the UE;
sending, by the apparatus, the first paging indication to the UE according to the paging request at the first sending moment, wherein the first paging indication is used to instruct the UE to receive, on the first paging resource, the first paging message sent by the base station, and the first paging message is a paging message used in the paging area paging; and
sending, by the apparatus on the first paging resource, the first paging message to the UE at the second sending moment, wherein the first paging message is scrambled by using a first paging scrambling code, and all the multiple cells each having the respective base station use the first paging scrambling code to scramble the first paging message when sending the first paging message.

14. The method according to claim 13, wherein the method further comprises:
sending, by the apparatus, the first paging scrambling code to the UE.

15. The method according to claim 13, wherein the first paging resource comprises a logical channel of a multimedia broadcast multicast service single frequency network MBSFN subframe, and the sending, by the apparatus, configuration information of the first paging resource to the UE comprises:
sending, by the apparatus, a sequence number of the MBSFN subframe and an identifier of the logical channel to the UE.

16. The method according to claim 15, wherein the first paging indication is sent by using a physical downlink control channel PDCCH, and the sending, by the apparatus, the first paging indication to the UE according to the paging request comprises:
sending, by the apparatus, the first paging indication to the UE according to the paging request and by using a PDCCH format corresponding to the first paging indication.

17. A method, comprising:
receiving, by an apparatus, configuration information that is of a first paging resource and that is sent by a base station, wherein the first paging resource is a paging resource used when the base station performs paging area paging, the paging area comprises multiple cells each having a respective base station, and all the multiple cells each having the respective base station use the first paging resource to page a user equipment (UE);
receiving, by the apparatus, a paging indication sent by the base station at a first sending moment which is a time that each of the base stations simultaneously send the paging indication to the UE; and receiving, by the apparatus on the first paging resource according to the paging indication and by using a first paging scrambling code, a first paging message sent by the base station at a second sending moment which is a time that each of the base stations simultaneously send the first paging message to the UE, wherein the first paging message is scrambled by using the first paging scrambling code, the first paging message is a paging message used in the paging area paging, and all the multiple cells each having the respective base station use the first paging scrambling code to scramble the first paging message when sending the first paging message.

18. The method according to claim 17, further comprising:

receiving, by the apparatus, the first paging scrambling code sent by the base station.

19. The method according to claim 17, wherein the first paging resource comprises a logical channel of a multimedia broadcast multicast service single frequency network MBSFN subframe, and the method further comprises:

receiving, by the apparatus, a sequence number of the MBSFN subframe and an identifier of the logical channel that are sent by the base station.

20. The method according to claim 17, further comprising:

receiving, by the apparatus on a second paging resource indicated by the paging indication, a second paging message according to a second paging scrambling code, wherein the second paging message is scrambled by using the second paging scrambling code, and the second paging message is a paging message used in cell paging.

* * * * *